United States Patent [19]

Kirk, Jr.

[11] 4,191,968

[45] Mar. 4, 1980

[54] VIDEO SIGNAL COMMUNICATIONS SYSTEM WITH IMPROVED SIGNAL-TO-NOISE RATIO

[75] Inventor: Donald Kirk, Jr., St. Petersburg, Fla.

[73] Assignee: Digital Communications, Inc., St. Petersburg, Fla.

[21] Appl. No.: 879,860

[22] Filed: Feb. 22, 1978

[51] Int. Cl.² .......................... H04N 5/21; H04N 7/00
[52] U.S. Cl. ...................................... 358/141; 358/167
[58] Field of Search ................ 325/141, 142, 167, 166

[56] References Cited

U.S. PATENT DOCUMENTS

| | | | |
|---|---|---|---|
| 3,499,108 | 3/1970 | Simon | 358/141 |
| 3,504,115 | 3/1970 | Suzuki et al. | 358/167 X |

Primary Examiner—Robert L. Richardson

Attorney, Agent, or Firm—Hopgood, Calimafde, Kalil, Blaustein & Lieberman

[57] ABSTRACT

A television communications system enhances the video signal-to-noise ratio by delaying video intelligence over an interval (as by loading the video into a store therefor), while obtaining a measure of its average value and dynamic range. At the transmitter, the video is then read out from memory, has its average value diluted and is amplified before transmission to approach the channel amplitude capacity.

At the receiver, the communicated average value and dynamic range signals are utilized to restore the average value to the received wave—and to appropriately reduce its relative amplitude. The concomitant channel amplitude reduction, with offsetting amplitude enhancement at the transmitter, improves the composite channel transmission ratio.

5 Claims, 11 Drawing Figures

VIDEO SIGNAL COMMUNICATIONS SYSTEM WITH IMPROVED SIGNAL-TO-NOISE RATIO

DISCLOSURE OF INVENTION

This invention relates to electronic communications and, more specifically, to improved transmission/multiplexing apparatus for distributing two independent video programs via a single satellite channel.

Communications satellites are currently employed to communicate varying forms of information. Such satellites (e.g., RCA I, II, Comstar I, Westar I, II, Anik I–III) are typically disposed in a substantially synchronous orbit (22,300 miles above the equator) and include multiple repeater channels having a 36 mHz band-width (with a 4 mHz interchannel guard band) receiving microwatts of radiated power from an originating ground station at an up-link frequency (about 6 gHz), and re-emitting an amplified (e.g. 3 watt) frequency hetrodyned repetition of the received intelligence at a downlink frequency (e.g., about 4 gHz).

An illustrative operational transfer characteristic for communications via satellite (typically frequency modulation) is shown in FIG. 1 via a curve 3. The ordinate and abscissa axes respectively represent the FM signal-to-noise vis-a-vis carrier-to-noise ratio of the frequency modulation output of the channel receiver. The curve is for a typical, constant carrier deviation (e.g. 20). The characteristic 3 includes a first, rising portion 5, a transitional point or area 8, followed by a markedly less steep region 7. As may be seen, and as is well understood, the point 8 represents the operational area above which the FM channel output signal exceeds threshold, and thus may be readily recovered with accuracy and fidelity. Correspondingly, below the transitional point 8, i.e., on the steep curve portion 5, the quality of the output signal (i.e., its signal-to-noise ratio) decreases very markedly for even a small degradation in the basic carrier-to-noise performance of the channel. It is apparent from FIG. 1 that the area attendant the curve portion 5 is critical. In the scaling of FIG. 1, a transmission system would work reasonably well, for example, in the area just above the 10 dB carrier-to-noise ratio and virtually not at all below a 6 dB ratio.

From terrestrial point-to-point video communication systems, e.g., microwave, an operating point may be selected (and usually is) well up on the curve portion 7 with no difficulty. This gives rise to a communications system with many dB of fade margin and the like to accommodate experienced transmission vagaries and perturbations. However, such a choice is simply not available for communications via satellite where an operating point 9 is typically in force quite near the critical threshold area 8 of curve 3. This limitation on performance margins basically stems from a severe power limitation. The energy available from solar energy collectors on the satellite is limited—and then must be proportioned over the ensemble of satellite Thus, in satellite communications, it has heretofore not been possible to reliably communicate two quality independent television signals via one satellite channel——and this not-withstanding the 36 mHz wide channel and the 6 mHz band width of the individual television programs. In particular, inter carrier harmonic distortion between a main and subcarrier, the carrier-to-noise degradation when main carrier frequency deviation is opportioned among the two video programs and the like have simply obviated quality dual-video program transmission. The inability of such operation, in the purview of FIG. 1, is to shift the effective carrier-to-noise available when a program passes from the operating region 9 to the region 5 below solid threshold to prevent reliable frequency demodulation of the independent video programs.

It is thus an object of the present invention to provide an improved video transmission system. More specifically, it is an object of the present invention to provide a television signal transmission/multiplexing arrangement to reliably transmit two independent video programs via a single satellite regenerating channel.

It is another object of the present invention to provide video signal amplitude expansion/comparison apparatus for improving video signal-to-noise ratio in transmission and non-transmission (e.g., tape) applications, both with and without signal multiplexing.

The above and other objects of the present invention are realized in a specific, illustrative video multiplexing communications system for distributing two distinct video programs via a single satellite channel. The arrangement utilizes time division principles, transmitting alternating lines of video information from the two programs by a frequency modulated single main carrier. For purposes of increasing the FM carrier-to-noise, and thereby also to maintain the video signal-to-noise ratio of each program above FM threshold, the alternating lines are compacted in time and occupy a substantial portion of the synchronizing pulse period of the video lines; one line is partially repeated to reduce spurious system transient responses upon program line switching; and amplitude expansion/reduction is employed to maintain a large FM carrier deviation.

The above and other features and advantages of the present invention will become more clear from the following detailed description of a specific illustrative embodiment thereof, presented hereinbelow in conjunction with the accompanying drawing, in which.

Figure 3A:
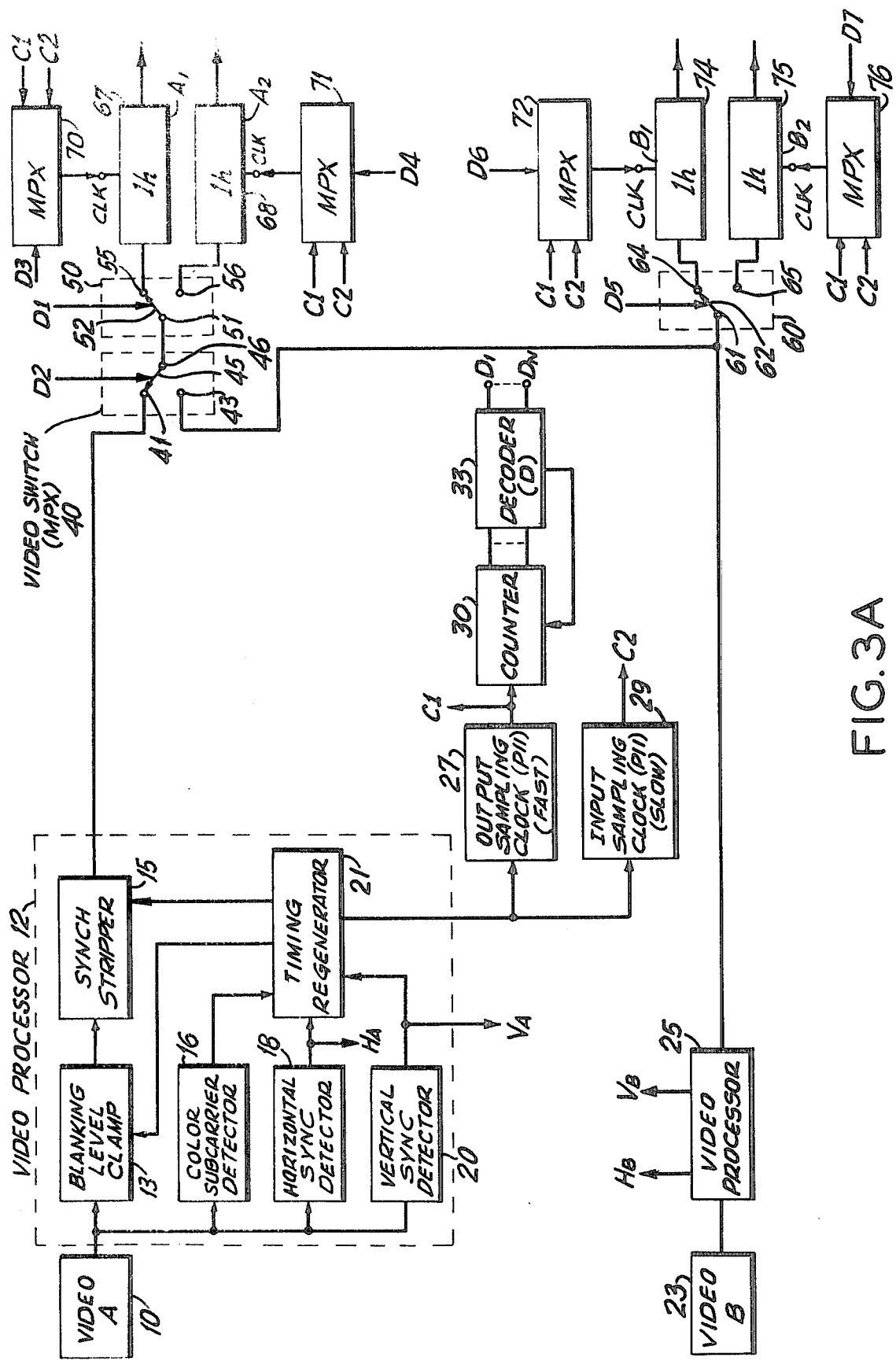
Figure 3B:
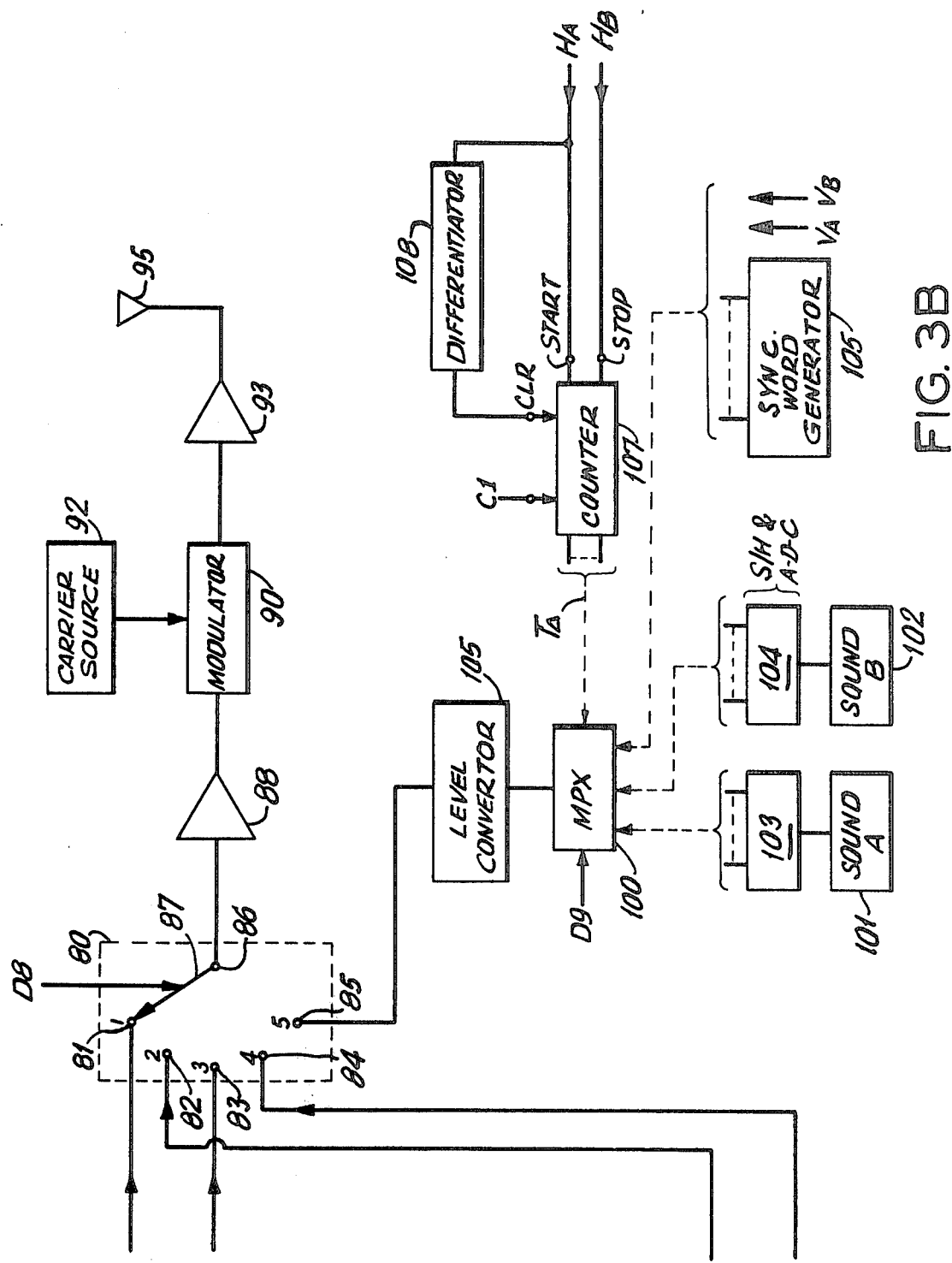
Figure 4A:
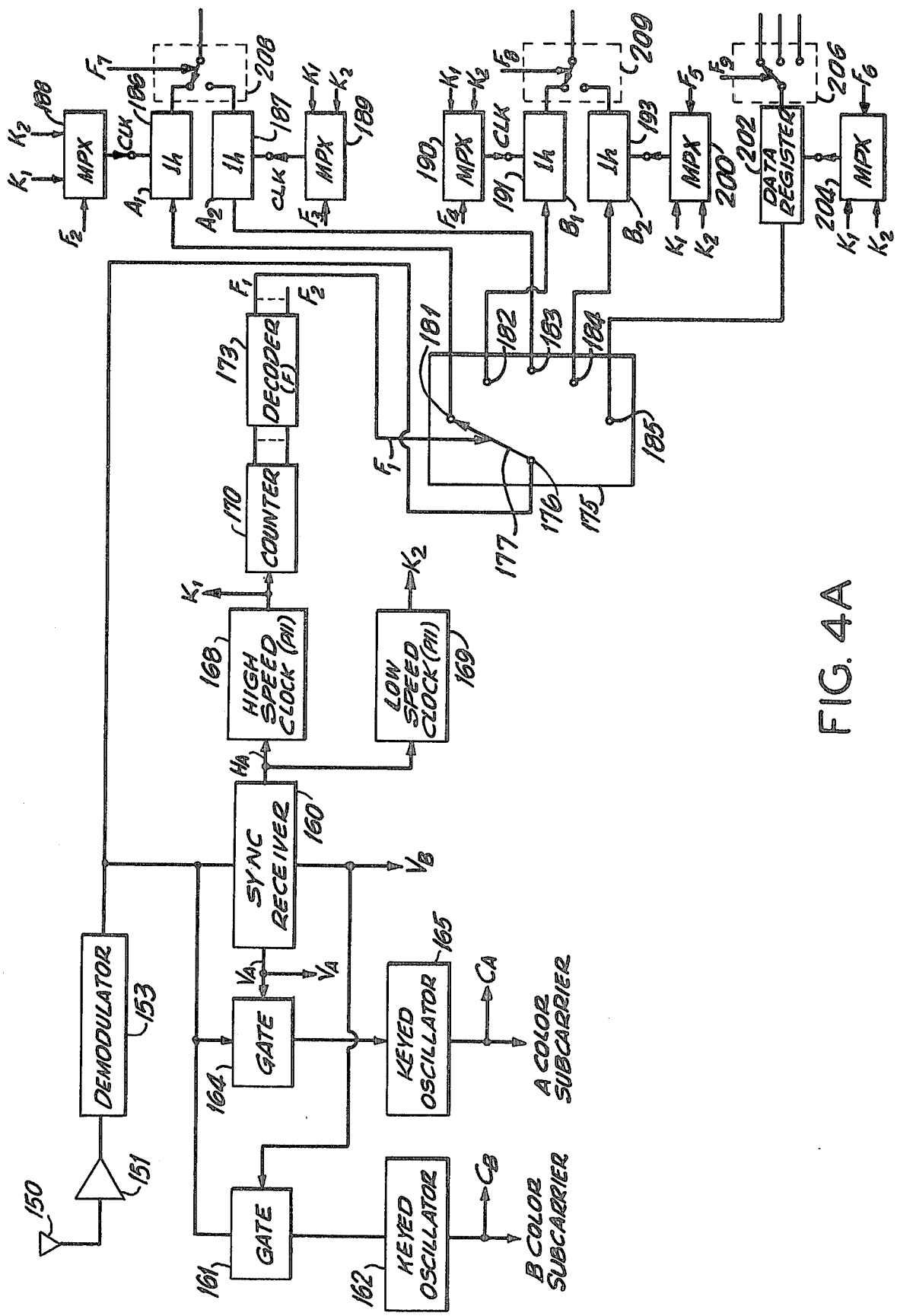
Figure 4B:
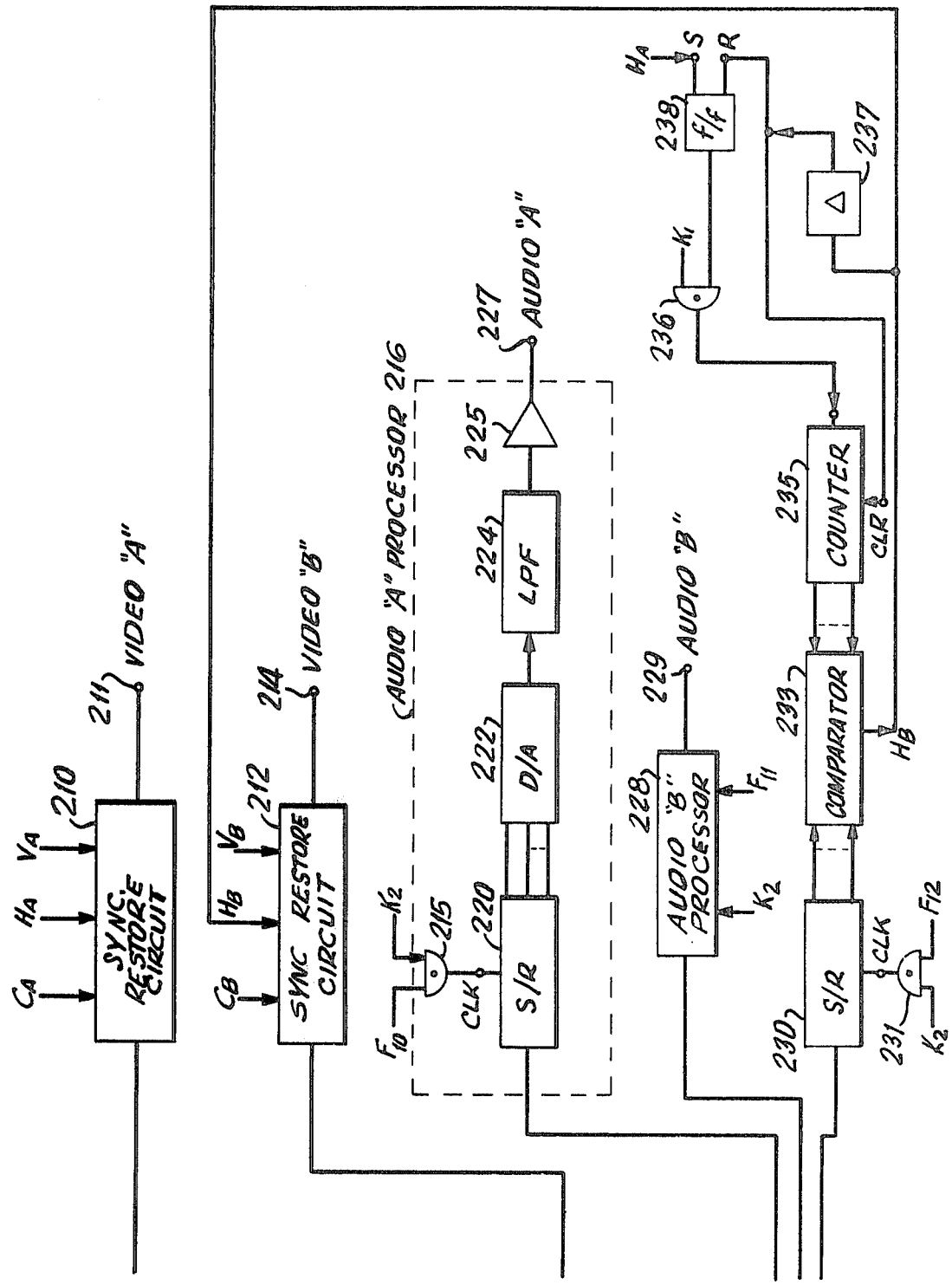
Figure 5:
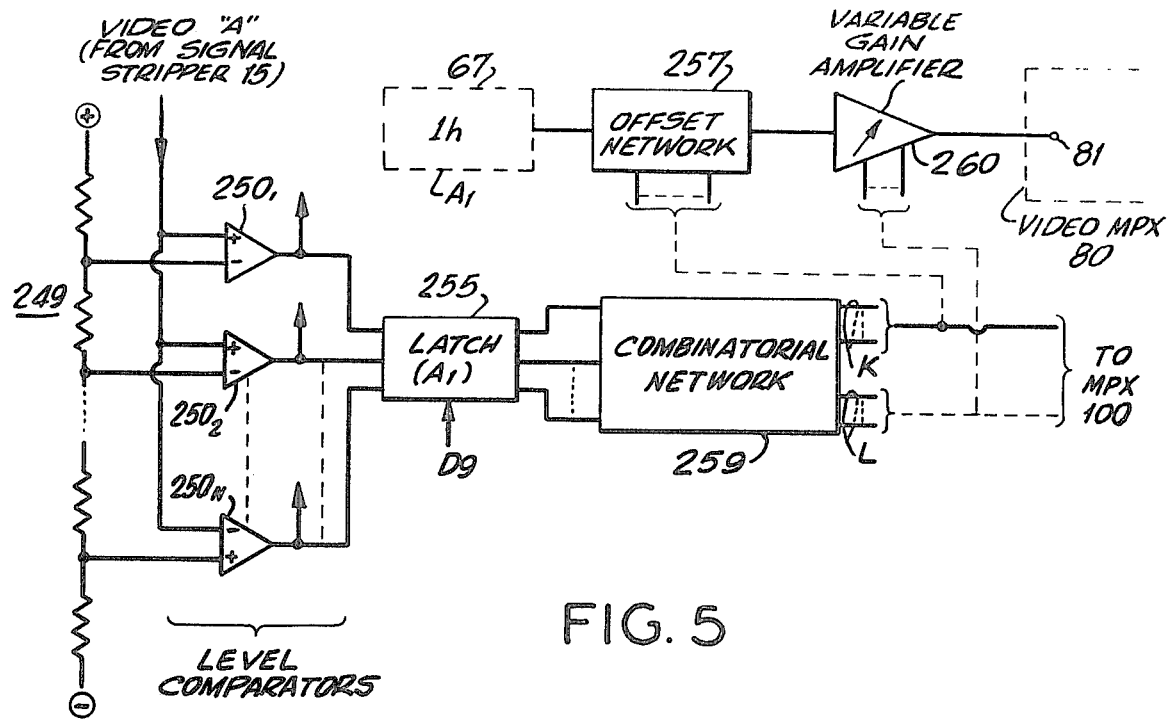
Figure 6:
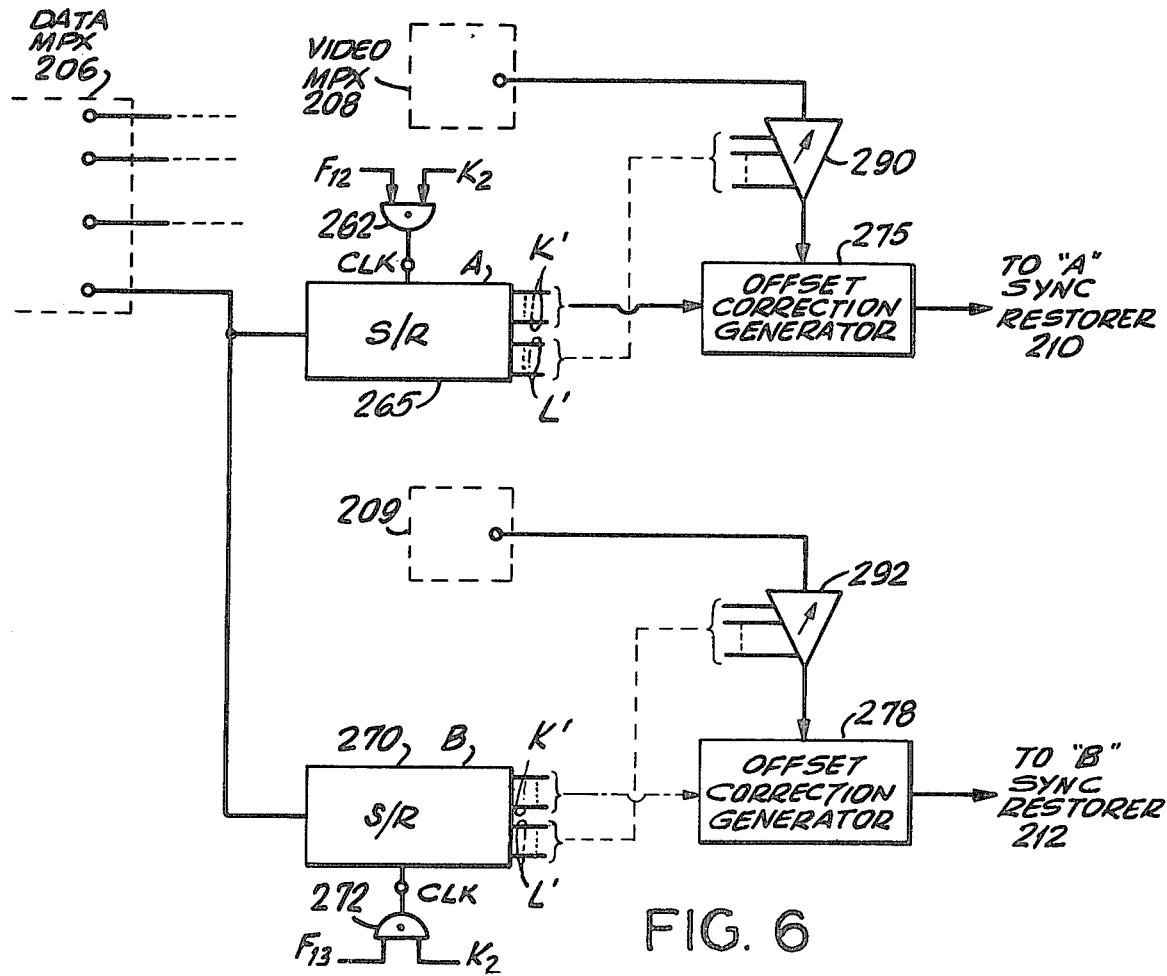

FIGS. 3A and 3B respectively comprise the left and right portions of specific, illustrative transmitter apparatus for transmitting two independent video programs;

FIGS. 4A and 4B respectively comprise the left and right portions of receiving apparatus for recovering the two video programs generated by the transmitter apparatus of FIGS. 3A and 3B;

FIG. 5 comprises optional, additional transmitter circuitry for effecting selective video signal amplitude enhancement to further improve the FM carrier-to-noise ratio; and FIG. 6 comprises optional receiver circuitry for selectively providing an inverse, waveform amplitude reduction to offset the amplitude enhancement effected by the FIG. 5 circuitry.

Figure 2A:
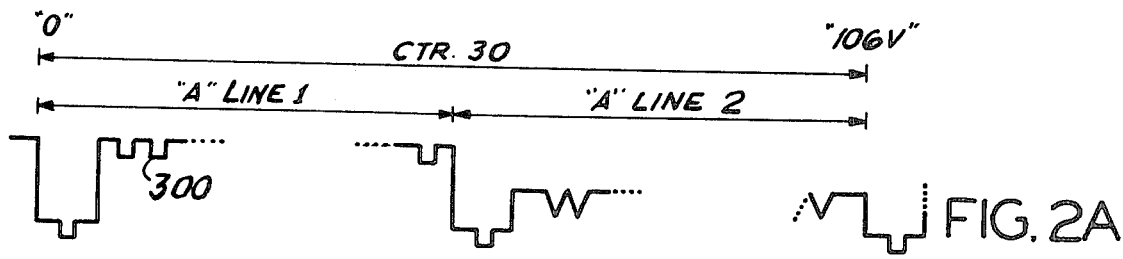
FIGS. 2A through 2D are waveforms characterizing operation of the present invention.
Figure 2B:
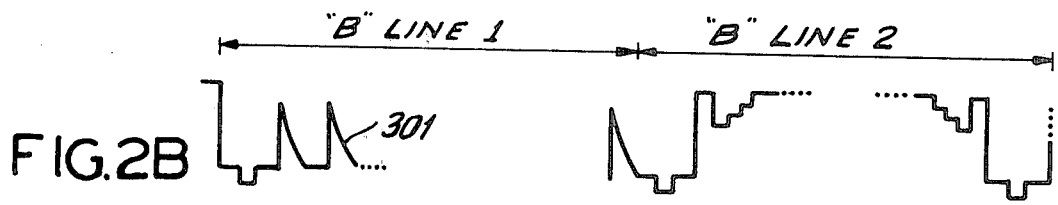

Referring now to FIGS. 3A and 3B, hereinafter referred to as composite FIG. 3, there is shown composite ground station transmitter apparatus for transmitting two independent video programs "A" and "B", respectively supplied by sources 10 and 23 thereof of any kind, e.g., a video camera, a video tape recorder, or the like. Illustrative video waveforms for the source A and B are shown in FIGS. 2A and 2B, two lines of each of the "A" and "B" programs being shown with random synchronization therebetween. Either one of the programs (e.g., the "A" program for purposes of concreteness) will be deemed the master or controlling program for synchronization. For purposes above-discussed, i.e., to maintain the recovered FM signal-to-noise ratio above threshold, a particular signal transmission format is employed—as is the necessary circuitry for generating (and receiving) such a signal.

In overview, the base band modulation of the transmitted wave (the output of amplifier 88 into frequency modulator 90) comprises a digital information sequence within a portion of the period previously occupied by the sync pulse of the A waveform. The interval between such digital sequences, i.e., the one horizontal line (1h = 1/15.734 kHz) standard interval is then occupied by one line of video intelligence of the "A" program accelerated in time (and thus in frequency); a small part of the video intelligence at the beginning of the next line of the "B" program; and the full next line of video intelligence of the "B" program repeated from its beginning. The digital information fields embodied in the digital message transmitted during the portion of each of the program "A" horizontal sync synchronizing intervals comprises: (1) a fixed, predetermined binary sequence identifiable at the receiver as a unique program "A" synchronizing pattern code word (2) digits identifying when the synchronizing interval occurs during a verticle synchronizing interval for the "A" and "B" programs; (3) a pulse code modulation plural bit sample representing "A" program audio and a plural bit sample for "B" program audio and (4) a digital word representing the period by which the horizontal sync pulses for the "B" program follow the horizontal sync period for the "A" program. For optional, further purposes below discussed, the composite digital information transmitted during the "A" program sync interval may also include a binary word measure of (5) average value and (6) dynamic range of the "A" program line and "B" program line transmitted following the digital information message to accomplish a further carrier-to-noise improvement below discussed in conjunction with FIGS. 5 and 6.

It is again noted that the particular transmission format, and structure for implementing that format, is expressly designed to ultimately preserve the FM output signal-to-noise ratio of each video program to assure that each may be safely recovered, above threshold. The small portion of the "B" program transmitted following the end of the "A" line is to condition the transmission system for "B" transmission following "A" line transmission, thus obviating transients and ringing which might otherwise occur for abrupt shifting outside a sync area (a problem otherwise conventionally associated with pulse amplitude modulation transmission). The short burst of "B" video accompanying an "A" video line is received during a blanking interval and is thus discarded in actual practice.

With the above overview in mind, and with respect to the particular transmission pattern above-considered, attention will now be focused directly upon the FIG. 3 apparatus which in fact gives rise to such transmission. The video portion of the "A" program is supplied by the source 10 to a video processor 12, "B" program video program being supplied by a source 23 to a comparable video processor 25. Only the processor 12 will be described, the processor 25 being substantially identical thereto. The processor 12 comprises per se well known individual circuits which operate upon the video intelligence and synchronizing components of the composite video wave supplied by the "A" source 10 thereof. In particular, the video waveform supplied by the source 10 is clamped to a blanking level by clamp 13 and then sync removed by a sync stripper 15. The output of sync stripper 15, supplied to input 41 of a video switch or multiplexer 40, thus comprises video information, clamped to blanking level, with sync removed. Detectors 16, 18 and 20 respectively recover from the video "A" program color subcarrier, horizontal synchronization (HA) and vertical synchronization (VA) each of these being supplied to a timing regenerator 21 which generates output pulses corresponding to color subcarrier, horizontal synchronization and vertical synchronization. Timing generator 21 may be any per se well known circuit or combination of circuits for effecting the foregoing (note, e.g., the MM5320 integrated circuit sync generator offered by National Semiconductor Corporation). Horizontal sync pulses regenerated via circuitry 21 (or directly from detector 18) is supplied for control purposes to the blanking clamp and sync stripper circuits 13 and 15.

Master system timing is generated by an output strobing clock 27, e.g. synchronized to the "A" channel waveform (for example, by employing a phase locked loop generating an output clock waveform bearing an integral multiple relationship with respect to the color subcarrier frequency output of the generator 21 (or circuit 16). A slower (input strobing) clock 29 is also employed, e.g., also by employing a phase locked loop synchronized to the color subcarrier frequency.

The fast, output strobing clock 27 effects two system functions. First, its output C1 is used to strobe (clock) out video information stored in elements 67, 68, 74 and 75. An approximate 2-to-1 video information speedup is required to get two lines of video information (one in the "A" program and one in the "B" program) into the one horizontal line (1h) real time period between "A" program synchronizing intervals. The fast clock 27 is also employed to generate all of the timing, control signals $D_1 \ldots D_n$ required for transmitter timing, e.g., by employing a counter 30 of sufficient capacity to subdivide the two line (2h) repetitive internal transmitter interval (vis-a-vis the 1h output transmission period) for the transmitter into the necessary number of states, the counter 30 driving a decoder 33 to produce the output ("D") signals at appropriate times. The operation of a cascade oscillator (clock) counter—and decoder is of course one per se common way of generating electronic system timing, and the decoder 33 may simply comprise coincidence gates with selective inversions, or integrated circuit versions thereof. It will be appreciated that some of the "D" control signals (and similar control information "F" at the receiver) may comprise groups of energized signal leads—e.g., to control multiplexers/demultiplexers which typically include their own internal state decoders.

The relatively slow C2 output pulses of clock 29 are used to strobe alternate lines of "A" and "B" video information as they occur in real time at conventional speed, into two lines of "A" memory 67 and 68, and two lines of "B" memory 74 and 75, respectively. To get the requisite video acceleration, the faster clock output C1 is employed to read information out of the memories 67, 68, 74 and 75 at the proper times to effectively comprise the modulation intelligence supplied to modulator 90.

To illustrate the operation of the transmission apparatus in more specific terms, successive lines of "A" program information as they occur in real time are present at the output of the sync stripper 15 of video processor 12 pass via a first video switch, or multiplexer, 40 which has a transfer member 45 (conceptual—see below) connecting the principle (upper) input terminal 41 via a controlling timing or address signal D2 and via a second, cascaded video switch or demultiplexer 50 to an alternating one of "A" video intelligence memories 67 or 68. Any memory device 67 or 68 (and 74 and 75) may be employed to store such information. One particularly advantageous form of such a memory comprising charged coupled devices well known per se to those skilled in the art, (e.g., such devices offered by the Reticon Corporation, Sunnyvale, Calif. in integrated ciruit form). One line of the incoming "A" video waveform is steered under control of the D1 timing information to register 67; the next line into register 68; the next following line again into register 67 (which in the interim would have been read out); and so forth. Multiplexer 40 is employed to connect the stores 67 and 68 (via demultiplexer 50) normally to the output of the "A" processor 12—but for short periods following an "A" line, to receive a small portion of the "B" information for the transient, ringing-obviating purposes above discussed. Again, the operation and control of the various multiplexers and the like is effected by timing signals at the output of decoder 33. One illustrative clocking sequence for the transmitter (and receiver) is set forth in Table I below (assuming 2000 states for counter 30 in the requisite 1h period):

TABLE I

| Clock State | Stores Loading | Memory Read (output) | Time Units/Bits | Information Content |
|---|---|---|---|---|
| 0000–0449 | ↓ | $A_1$ | 450 | A Video |
| 0450–0454 | ↓ | $A_1$ | 5 | B Video |
| 0455–0904 | $A_2,B_1$ | $B_2$ | 450 | B Video |
| 0905–0909 | ↓ | $B_2$ | 5 | B Video |
| 0910–0941 | ↓ | Digital | 32 | System Sync |
| 0942–0951 | ↓ | Digital | 10 | A/B Sync. |
| 0952–0959 | ↓ | Digital | 8 | A Audio #1 |
| 0960–0967 | ↓ | Digital | 8 | A Audio #2 |
| 0968–0975 | ↓ | Digital | 8 | B Audio #1 |
| 0976–0983 | ↓ | Digital | 8 | B Audio #2 |
| 0984–0999 | ↓ | Digital | 16 | Noise Reduc. |
| 1000–1449 | ↓ | $A_2$ | 450 | A Video |
| 1450–1454 | ↓ | $A_2$ | 5 | B Video |
| 1455–1909 | ↓ | $B_1$ | 455 | B Video |
| 1910–1941 | ↓ | Digital | 32 | System Sync |
| 1942–1951 | $A_1,B_2$ | Digital | 10 | A/B Sync |
| 1952–1959 | ↓ | Digital | 8 | A Audio #3 |
| 1960–1967 | ↓ | Digital | 8 | A Audio #4 |
| 1968–1975 | ↓ | Digital | 8 | B Audio #3 |
| 1976–1983 | ↓ | Digital | 8 | B Audio #4 |
| 1984–1999 | ↓ | Digital | 16 | Noise Reduc. |

The $A_1$, $A_2$ registers 67 and 68 will thus have stored therein successive, alternating lines of "A" video, followed by a small portion (five clock time units worth) of "B" video.

In a similar manner, multiplexer 60 under control of the timing signal D5 steers alternating lines of "B" program video appearing at the output of video processor 25 into one line stores 74 and 75 of $B_1$, $B_2$ video.

As above discussed, information is read into the memory elements 67, 68, 74 and 75 in real time (and thus, for example, under control of the relatively slow output C2 of clock 29 although slower changing output "D" signals might be employed as well). The C2 block input is operatively selected for the memories 67, 68, 74 and 75 at such times via multiplexers 70, 71, 72 and 76 under control of timing signals D3, D4, D6 and D7, respectively.

Turning now to generation of the digital signal fields necessary to constitute the code group message occurring during a portion of the "A" program sync interval, the sound portions of the "A" and "B" programs are supplied by sources 101 and 102 thereof to cascaded sample-and-hold and analog-to-digital converter circuits of any well known form 103 and 104. The circuits 103 and 104 respectively present at their outputs to multiplexer 100 a digital word comprising a pulse code modulated representation of the last sample of "A" and "B" audio. Since the audio is sampled a predetermined number of times every line (1h) period, e.g., two-See Table I) fully fidelity audio information is incorporated in the transmitted wave. The predetermined, special sync word group is supplied to multiplexer 100 as from any conventional word generator or register 105 (which may simply comprise a fixed wired pattern of binary "1's" and "0's"), together with the vertical retrace VA and VB information for the two programs. Finally with respect to code group message generation, a counter 107 supplies to the multiplexer 100 a binary word $T\Delta$ comprising a measure of the time elapsed between the horizontal sync pulses for the "A" and "B" lines. The signal $T\Delta$ may be generated by the counter 107 counting the C1 pulses occuring between an "A" line horizontal sync pulse (HA) and the next following "B" line horizontal sync pulse (HB), a differentiator 108 being employed, for example, to clear the counter 107 at the beginning of each "A" line sync pulse.

With the above preliminary discussion in mind, the above described transmitted modulation intelligence is thus very simply generated by multiplexers 100 and 80 selecting the appropriate information, in the proper sequence, for communication via amplifier 88 to the modulation input of the modulator 90. Thus, to form one line (1h real time) of a composite video message formated as above discussed, the master output multiplexer 80 begins with its transfer member 87 in its lower-most position contacting terminal 85. It will be appreciated that this is symbolic—in fact the multiplexer 80 will typically comprise an electronic analog circuit, e.g., having a series of FET switches or the like connecting a common output 86 with each of the multiplexer inputs, each of the FET switches being activated in its proper sequential turn under control of the plural timing (selector) signals D8. With the multiplexer transfer element 87 in its symbolic lower position above described, digital code field multiplexer 100 sequentially reads out the information-bearing code groups during a portion of the "A" line horizontal sync interval in any predetermined order. For example, under control of the timing command signals D9, the multiplexer 100 may read out to the modulator 90 via the multiplexer 80 and amplifier 88, in sequence, the preselected sync word from generator 105, the "A" and "B" program vertical retrace signalling bits VA and VB; the "A" and "B" program audio samples from the outputs of analog-to-digital converters 103 and 104, and the inter-horizontal sync pulse delay $T\Delta$ from the output of counter 107. See also Table I for clock intervals 0910–0999 for a possible specific code message format. A voltage level shifter 105 may be employed, as desired, to convert the digital information from the digital circuits above discussed to such "1"–"0" levels as may be appropriate for the particular modulator 90 employed.

Following (in the cyclic sync) the various digital field transmissions above described, one line of "A" video followed by one line of "B" video is read out from memories 67 or 68, and 74 or 75 under control of the fast output clock 27 pulses C1, with appropriate multiplexer 80 selections being effected pursuant to D8 control information. Thus, for example, a line A1 from memory or delay line 67 may be followed by line B1 from memory or delay line 74. This completes one transmission period (1h real time), next followed by another code group burst (multiplexer 80 connection to its lowermost symbolic input); transmission of the next following "A" program line A2 from memory 68; and the next following B2 line from memory or delay 75. This process repetitively occurs and continues the transmission of the entire "A" and "B" video and audio programs.

Modulator 90, assumed to be a frequency modulator, receives a sinusoidal carrier from a carrier source 92 and the composite amplified modulation intelligence from multiplexer 80. The output of modulator 90 is amplified and filtered in band pass amplifier 93, and readiated as to a satellite repeater via antenna 95.

Turning now to FIGS. 4A and 4B, referred to below as composite FIG. 4, there is shown a receiver for receiving the transmission of the FIG. 3 transmitter. For reception via satellite, the FIG. 3 transmitter uplink will be frequency converted (downshifted for present day satellites) by the satellite and radiated to be available to facing receiving stations disposed within its output beam pattern—typically the better part of a continent or the like. Thus one FIG. 3-type transmitter may broadcast to a host of FIG. 4-type receivers.

As is typical for communications in general, the FIG. 4 receiver does the inverse of the FIG. 3 transmitter-effected operations to recover the basic communicated intelligence. An antenna 150—typically a parabolic surface ("dish") pointed towards the satellite and having a pick-up element at its focus, recovers the signal repeated by the satellite. The recovered signal is amplified in an amplifier and band pass filter 151, and the modulation intelligence stripped from the carrier via frequency demodulator 153. The demodulated signal is supplied to a frequency demultiplexing network or switch 175 again only schematically shown for didactic purposes as having a commutator 77. It will be understood that the demultiplexer 175 will typically comprise a series of analog gates such as FET switches having a common input and distinct outputs. The demodulated output is also supplied to a sync recovery circuit 160 for recovering the special "A" program horizontal sync code word originally generated by the circuitry 105 of FIG. 3, and which also receives the vertical retrace intelligence VA and VB generated with the sync word. Circuitry 160 for recognizing any predetermined binary sequence (e.g., the digital pattern produced by the generator 105) is per se well known to those skilled in the art. See, for example, the serial sync word recognition circuitry of U.S. Pat. No. 3,934,079 for "BILATERAL COMMUNICATIONS SYSTEM FOR DISTRIBUTING COMMERCIAL AND PREMIUM VIDEO SIGNALING OF AN ACCOUNTABLE BASIS" which employs serial recognition via an Exclusive-OR bit-by-bit comparison of the requisite word clocked out of an internal shift register with the received binary word. Alternatively, such sync recognition has heretofore been effected by a parallel comparison (coincidence logic) between incoming bits collected into a shift register and a fixed register containing the desired pattern. See as an example of this, U.S. Pat. No. 3,833,757 "ELECTRONIC BILATERAL COMMUNICATION SYSTEM FOR COMMERCIAL AND SUPPLEMENTARY VIDEO AND DIGITAL SIGNALLING". Once "A" line sync is recognized, the following vertical sync information VA, VB is recovered by straight forward time division principles, merely loading the next following two bits into a register or flip-flops.

The line sync output HA is directly employed in a manner analogous to the FIG. 3 circuit to synchronize a high speed clock 168 and low speed clock 169, e.g., each formed of a phase locked loop each with a different feedback factor to change the output frequency. The $K_1$ output of a high speed clock 168 is used to produce composite timing signal(s) $F_1 \ldots F_i$ for receiver timing via a counter 170 and cascaded decoder 173. The high speed $K_1$ clock and the low speed $K_2$ output of clock 169 are also used in an analogous, inverse manner vis-a-vis the transmitter, i.e., the high speed clock loading the received, accelerated video into the "A" video stores 186 and 187 and "B" video stores 191 and 193, while the low speed clock $K_2$ clocks stored video out from these registers at the slower (about half) rate at which the video information was originally loaded into the transmitter stores 67, 68, 74 and 75.

Keyed oscillators 162 and 165 are employed in the receiver to regenerate "A" color subcarrier CA and "B" program color subcarrier CB signals, these oscillators being selectively activated by gates 161 and 164 during the "A" and "B" vertical retrace intervals by the VA-VB signals supplied by the circuitry 160. Again, the keyed oscillators 162 and 165 may simply comprise phase locked loops.

The alternating lines of video at the ouput of demodulator 153 (e.g. A1, B1, A2, B2 . . . ) are steered by multiplexer 175 into the memories 186, 191, 187, and 193 under control of receiver $F_1$ timing information from the output of the timing state decoder 173. For such operation, multiplexers 188, 189, 190 and 200, operative under control of timing outputs $F_2$, $F_3$, $F_4$, and $F_5$ from decoder 173, select the high speed clock $K_1$ for store control. Thus, successive lines of the "A" program repose in store or shift registers 186 and 187 which may again comprise the per se well known charged coupled device implementations.

To reconstitute "A" program video, an "A" multiplexer 208 under timing control $F_7$ alternatively reads the information out of the stores 186 and 187 such that the output of multiplexer 208 comprises the video intelligence stream for the "A" program. For such readout, the slow $K_2$ clocking is selected by multiplexers 188 and 189. The reassembled video "A" is supplied to a sync restoring circuit 210, together with the horizontal and vertical timing information HA and VA and the color subcarrier wave CA. The output of sync restorer circuit 210 thus comprises the full "A" video program, with all synchronizing information present but without audio which is supplied at the output terminal 227 as below discussed. As before, sync restoring circuits 210 are per se well known in the video processing art. Indeed, such circuitry are obtainable in integrated circuit form—see, e.g., the above noted National Semiconductor MM5320 unit.

A similar mode of operation regenerates the "B" video information at an output port 214, information being alternately clocked at the relatively slow $K_2$ speed from stores 191 and 193 and processed by sync restorer circuit 212.

Figure 1:
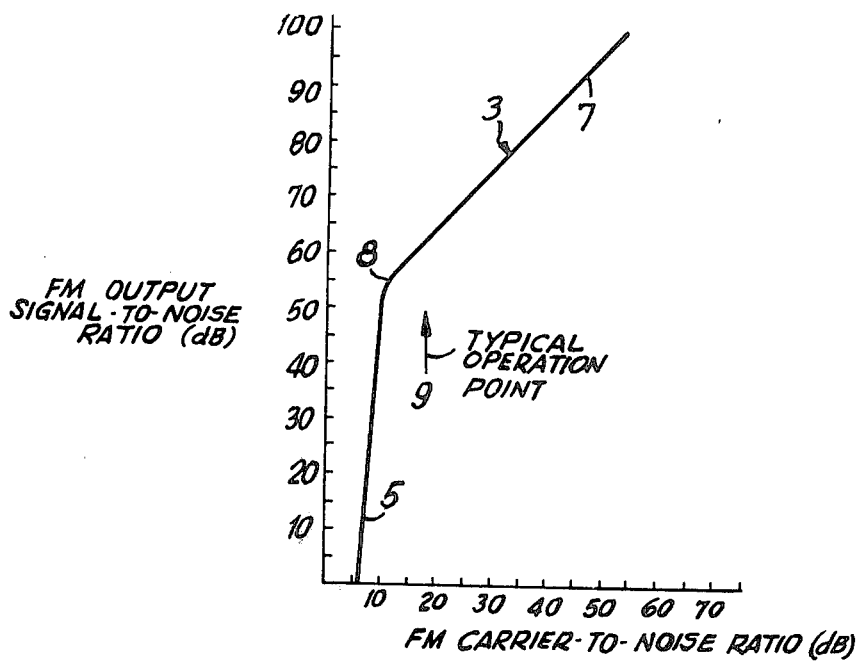
FIG. 1 is a curve depicting FM channel output signal-to-noise ratio vis-a-vis FM carrier-to-noise ratio as above discussed.

Attention will now be directed to decoding the digital information (other than sync recovery above discussed) transmitted during a portion of the interval corresponding to the "A" channel horizontal synchronizing pulses of FIG. 1A. During the time that such digital information is being received, such signals present at the output of demodulator 153 are coupled by the demultiplexer 175 (connection of the schematic transfer member 177 to the lowest output terminal 185) to a data register 202. During such data loading operations, the fast $K_2$ clock is selected by timing signal $F_6$. At some later time again under control of the $F_6$ timing signals, data is clocked out at the slow, $K_2$ clock rate and loaded via a data field alloting demultiplexer 206 into a shift register 220 in an "A" channel audio processor 216 (the "A" program audio sample); a similar shift register in a like "B" channel audio processor 228; and into a shift register 230 for decoding the $T\Delta$ inter-sync bit interval. Examining first the "A" channel audio processing, information is clocked into and out of the shift register 220 by a coincidence gate 215 operating at the $K_2$ slow clock rate under control of an $F_{10}$ timing command; is read out in parallel and converted to analog format by digital-to-analog converter 222 and is passed to the "A" channel audio output port 227 via a low pass filter and amplifier 224 and 225. The audio processor 216 thus operates in the per se conventional manner to reconstruct a continuous analog audio signal from digital samples thereof. Similar processing obtains to regenerate the channel "B" audio program component at output port 229 via processor 228.

To derive the requisite "B" channel horizontal sync pulse HB, the $T\Delta$ information loaded into shift register 230 under control of the slow clock $K_2$, timing signal $F_{12}$ and coincidence gate 231 is supplied in parallel as one set of inputs to a comparator 233. A counter 235 (initially in a cleared state) begins counting $K_1$ clock pulses when a flip-flop 238 is initially set by the "A" channel horizontal sync pulses HA, the flip-flop 238 enabling an AND gate 236 to pass the $K_1$ pulses to the counter 235. When the monotonically increasing output state of the counter 235 matches the $T\Delta$ contents of shift register 230, comparator 233 signals a match which corresponds to the "B" horizontal sync pulse HB, which is thus supplied to the channel "B" sync restorer 212. After a short delay produced by a delay circuit 237 (e.g. effected by cascaded gates, one-shot circuitry or the like) the counter 235 and flip-flop 238 are reset (cleared) to await the next cycle of operation.

Thus, the FIG. 4 receiver is fully operative to recover the video, audio and sync portions of the "A" and "B" programs, precisely as originally supplied by the video and audio sources 10–101 and 23–102 in FIG. 3. Moreover, by reason of the modulation process above described, such reception yields ultimate FM output signal-to-noise ratios for each of the signals which are above threshold, and which can be recovered with good quality.

Turning now to FIGS. 5 and 6, there is shown optional further circuitry for providing an additional improvement in the recovered signal-to-noise characteristics. In brief, the FIG. 5 circuitry operates to enlarge the amplitude of signals exhibiting a relatively small dynamic range (i.e., peak-to-peak variation) during any video "A" or "B" line, while FIG. 6 effects a corresponding, inverse signal restoration (relative signal amplitude reduction) to its original amplitude. Signal-to-noise improvement is realized since, at the receiver, noise is reduced by the same factor as the signal—while the noise (unlike the signal) was never enhanced. As a further and implicit function of the foregoing, the DC value of the video line is substantially eliminated during transmission, and restored at the receiver. Digital code fields K are transmitted and received as part of the composite binary message transmitted during the portion of the "A" channel synchronizing interval to signal the proper DC value for the transmitter "A" and "B" lines, and code fields are transmitted to communicate the gain effected at the transmitter (which becomes the reduction factor at the receiver). The apparatus obviously has special utility for satellite transmission where maintaining an adequate signal-to-noise ratio is especially important and difficult. The principles and structure is applicable also, however, to any other form of transmission.

Figure 2C:
Figure 2D:
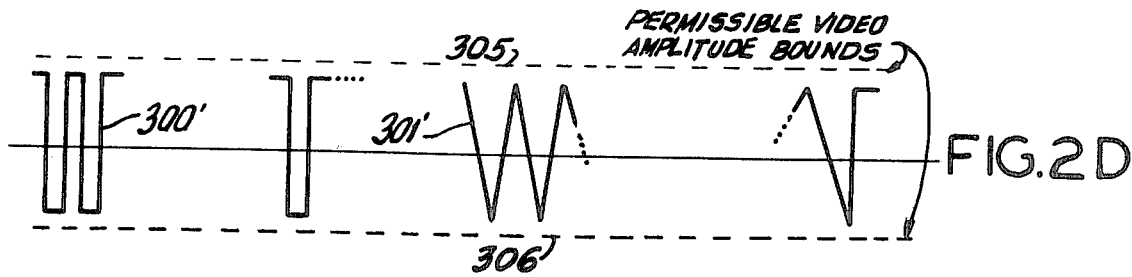

To further illustrate, assume again that the video waveforms of FIGS. 2A and 2B are to be transmitted. During the first 1h full line period of transmission, rectangular pulses 300 (departing from substantially white level) are transmitted as the program "A" first line, followed by triangular pulses 301 as the first line of the "B" program (which are shown as deviating from substantially black level). Thus, for the transmitter of FIG. 3 alone, the video waves 300 and 301 would be successively transmitted as shown in FIGS. 2A and 2B in their proper size, and with their proper DC average levels. However, employing the transmitter-receiver apparatus supplementations of FIGS. 5 and 6, the DC values of the two lines are stripped as shown in FIG. 2C such that the waves 300 and 301 are shown about a substantially zero average level. Thereafter, each of the waves 300, 301 is amplified such that their peak-to-peak variations approach the bounds 305 and 306 for maximum transmission amplitudes for video information, as shown in FIG. 2D. Together with the transmitted video wave of FIG. 2D, the transmitted digital message for the 1h line (real time) covering the first lines of channel "A" and "B" video includes the offset levels for A1 video 300 and B1 video 301 (i.e., their subtracted out DC values), as well as the gain factors for the waves 300 and 301 to permit DC reinsertion, and gain reduction at the receiver.

Particular circuitry for implementing the above functional description at the transmitter is shown in FIG. 5, and for the receiver in FIG. 6. Considering first the transmitter circuitry, the video waveform supplied by sync stripper 15 (FIG. 3) is supplied to one input of an array of latching analog comparators 250 each having their other output connected to a different tap of a voltage divider string 249 at the same time it is loaded into an associated one of the stores 67, 68, 74 or 75 (assumed to be store 67 for concreteness). The voltage divider 249 supplies the upper amplifier $250_1$ with a signal larger than any possible peak value for the video wave and the amplifier $250_n$ is supplied with a constant voltage less than the lowest possible value for video information. Thus the comparators $250_1$ and $250_n$ are never switched and supply a fixed binary output value to a following latch 255. However, all intermediate amplifiers $250_2, \ldots, 250_{n-1}$ may or may not be switched depending upon (1) the DC or average level of the line under consideration, and (2) the peak-to-peak variations (or dynamic range of the line of video being processed. Some reflection will show that for any wave, the binary output pattern entered into the latch as the line is being processed will be of the form of a sequence of one or more "0's" (voltage divider outputs higher than the largest highest value of the video wave during the line, for the upper group of comparators and vice versa for the lower group having input polarities reversed) followed by a continuous sequence of binary "1's" (highest value of the digital wave during the line exceeding the voltage outputs divider, followed by another sequence of "0's" (voltage outputs of the divider 249 being less (in the absolute sence) than the smallest value of the video wave during the line. Thus, the number of binary "1's" loaded into the latch 255 provides a direct measure of the dynamic range of the signal, while the place of the central one of the sequence of "1's", however long, provides a direct measure of the average value of the line being processed. Timing signals $D_9$ from decoder 33 (FIG. 3) disables the inputs and locks the latch 255 following processing for the "A" video line ($D_9$ timing, after a delay, may also clear the latched comparators). A linear combinatorial network 259 generates two output bit groups K-L, the group K indicating the average value of the "A" video information processed (indicating the center of the sequence of "1's" loaded in the latch), and the code group L providing a digital word signaling the dynamic range of the line (i.e., indicating the number of "1's" in the latch 255). Any table load circuit or read only memory may be used in place of the combinatorial network 259.

The average value information K is supplied to control a voltage offset network 257 of any standard kind to eliminate the DC line value—most typically a ladder network receiving the video information from an associative one of the video delays or stores (e.g., the store 67 of FIG. 3), while the dynamic range code group L inversely controls the gain of variable gain amplifier 260 of any construction (the smaller the dynamic range signal L, the larger the gain effected by amplifier 260). Accordingly, when the video information processed by the FIG. 5 circuitry (and also loaded into the associated store 67) is read out from the store 67, its average value is removed in circuit 257 and its gain is selectively increased in amplifier 260 to approach the bounds 305-306 of FIG. 2D. The code groups K-L for the "A" line considered are also supplied to multiplexer 100 (FIG. 3) to be transmitted as a code group field to all receivers during the "A" video synchronizing pulse period. The apparatus shown in FIG. 5 processes video information for one of the video stores, e.g. the store 67. Such apparatus would be repeated for the other video stores 68, 74 and 75. Alternatively, as is well known to those skilled in the art, a portion of the FIG. 5 circuitry can be common to all stores, and a multiplexer employed to control a single offset network, variable gain amplifier and combinatorial network 257.

At the receiver, an essentially inverse operation occurs. The received average value and dynamic range information for the "A" channel (denoted K' and L' in the drawing) is clocked into a shift register 265 under control of timing $F_{12}$ and the slow clock $K_2$ from master data register 202 and demultiplexer 206, and thus appears in parallel at the outputs of the shift register. The line of "A" video from multiplexer 208 has its gain reduced (in relative terms) by an associated variable attenuator or amplifier 290 controlled by the recovered dynamic range enhancement signal L' and its DC level thereafter restored by the voltage reinsertion of a K' signal dependent offset correction generator 275 (again, for example, most simply a ladder network). The signal is then supplied to the "A" channel sync restorer circuit 210 of FIG. 4 for final sync insertion as above discussed with respect to FIG. 4. A similar operation obtains for the "B" program line transmitted following the sync code group in a manner directly parallel "A" channel signal processing above discussed.

Thus, the structure of FIGS. 5 and 6 is fully operative to provide transmission of video information in substantially enlarged form with corresponding restoration of the signal at the receiver with concomitant reduction of noise by a like factor. This gain substantially further improves the overall signal-to-noise ratio of the subject transmission equipment.

The above described arrangement is merely descriptive of the principles of the present invention. Numerous modifications and adaptations thereof will be readily apparent to those skilled in the art without departing from the spirit and scope of the present invention. For example, it is clear that the video signal amplitude expansion and comparison herein may be used with any video signal source, transmitted or not transmitted, multiplexed or not multiplexed.

What is claimed is:

1. In combination in apparatus for improving the signal-to-noise ratio of a transmitted video signal, a source of video information, storage means, means for reading a segment of the video information from said source thereof into said storage means, video signal processing means connected to said video source, said video processing means including means for providing a first signal comprising a measure of the average value of the video information over said segment and means for providing a second signal comprising a measure of the dynamic range of said video information relative to said direct current value over said timed segment, cascaded voltage shifting means and variable gain means each connected to said video processing means and respectively controlled by said first and second signal provided thereby, and means for reading information out of said storage means to said voltage shifting means, said voltage shifting means including means for selectively substantially reducing said direct current video segment value, and said variable gain means including means for selectively amplifying the output of said voltage shifting means.

2. A combination as in claim 1 further comprising means for distributing the video output of said variable gain amplifier and said first and second signals, means for receiving and recovering said video output of said variable gain amplifier and said first and second signals, cascaded receiver variable gain means and direct current voltage reinsertion means respectively controlled by said received and recovered second and first signals, respectively, and means for supplying said received and recovered video signal to said variable gain means.

3. A combination as in claim 1 wherein said first and second signal providing means comprise plural comparator and latching means each having one input connected to said video source, and plural voltage source means each connected to a second input of each of said comparator means.

4. A combination as in claim 3 further comprising binary word generating means connected to said comparator and latching means.

5. In combination in receiver apparatus for receiving a composite video wave comprising first and second signals and a segment of video information having its average value selectively reduced and its gain selectively increased, said first and second signals respectively embodying information regarding the amount of average value reduction and gain increases, said receiver including cascaded variable gain means and direct current voltage reinsertion means respectively controlled by said received second and first signals, respectively, and means for supplying said received video signal to said variable gain means.

* * * * *